April 20, 1948.  G. A. WILSON  2,440,214
VERMIN DESTROYER
Filed Jan. 5, 1946
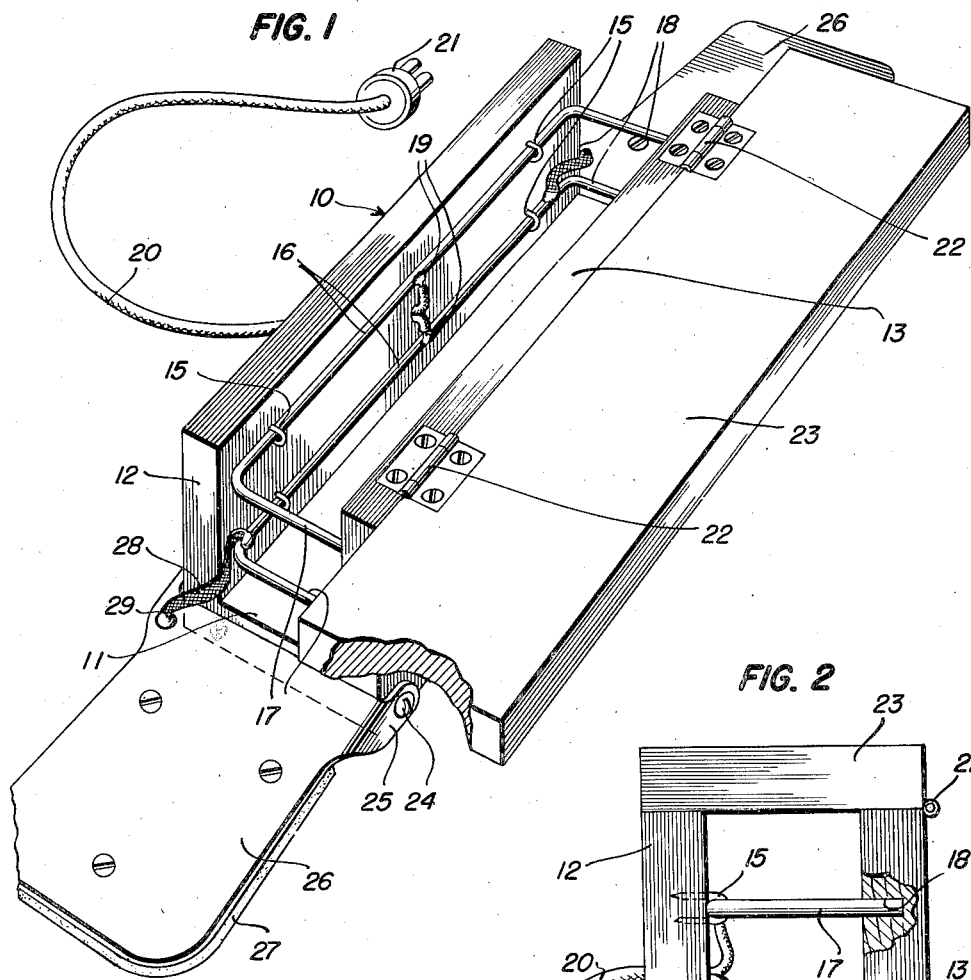
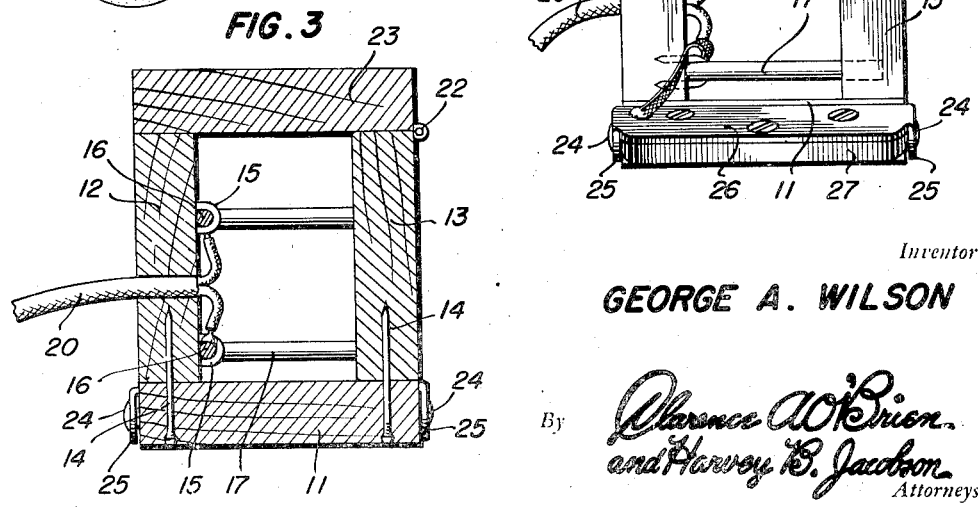
Inventor
GEORGE A. WILSON Patented Apr. 20, 1948

2,440,214

UNITED STATES PATENT OFFICE 2,440,214

VERMIN DESTROYER

George A. Wilson, Bogue Chitto, Miss.

Application January 5, 1946, Serial No. 639,327

1 Claim. (Cl. 43—98)

This invention relates to a vermin destroyer and particularly to equipment for destroying rats, mice, and the like.

The primary object of the invention is to destroy vermin such as mice, rats, and similar small animals and at the same time protect humans from injury.

Another object is to entice the vermin to be destroyed so as to cause them to endeavor to reach bait contained therein, and then through electrical means cause the execution of the vermin.

The above and other objects may be attained by employing this invention which embodies, among its features, a substantially trough-shaped bait container open at opposite ends, a pair of spaced, parallel electrodes extending across each end of the bait container in such a position as to bar entry of the vermin into the bait container, and means to connect the electrodes to a source of electrical energy whereby, when the animal seeks to enter the trough-shaped container, it will contact the electrodes and become electrocuted.

Other features include a cover adapted to close the open, upper side of the bait container, and a conducting platform at each end of the bait container which is connected to one electrode at each end of the container so as to increase the area of electrical contact of the animal to insure proper electrocution.

Referring to the drawings,

Figure 1 is a perspective view of a vermin destroyer embodying the features of this invention, certain portions being broken away to more clearly illustrate certain details of construction, Figure 2 is an end view in elevation of the device illustrated in Figure 1, and Figure 3 is a transverse sectional view through the vermin destroyer.

Referring to the drawings in detail, this improved vermin destroyer comprises a bait container designated generally 10 which is of trough-shaped structure and formed of a bottom wall 11 to which side walls 12 and 13 are secured as by nails 14 (Fig. 3).

Secured as by staples 15 to the side wall 12 and extending longitudinally thereof in spaced, parallel relation are bus bars 16, the ends of which are bent angularly to form spaced parallel electrodes 17 which extend transversely of the trough or bait container 10 and have their ends opposite those connected to the bus bar 16 received in sockets 18 formed in the wall 13. As illustrated in Figure 1, the bus bars 16 are of slightly less length than the length of the side walls 12 and 13 of the bait container so that the ends of the bottom and side walls 11, 12 and 13, respectively, will serve to protect persons from contacting the electrodes 17. Soldered or otherwise connected, as at 19, to the bus bars 16 are the terminals of electrical conductors which are carried through a suitable cable 20 to any suitable connecting device 21 by which the cable and bus bars may be connected to a source of power.

Hingedly connected, as at 22, to the upper edge of the wall 13 is a cover 23, the ends of which project beyond the ends of the wall 13 so as to form guards which cooperate with the walls 12 and 13 in preventing contact of the electrodes 17 by humans, or the like.

Attached as by screws 24 to opposite ends of the bait container 10 are attaching ears 25 of platforms 26, each of which is preferably formed from a conducting material such as iron or copper, to the back or underside of each of which is attached an insulating pad 27. A conductor 28 is soldered or otherwise attached to the lowermost bus bar 16 adjacent opposite ends thereof and these conductors 28 are in turn soldered, as at 29, to their respective platforms 26. It will thus be seen that when the lower bus bar 16 is energized, the platforms 26 also will be energized.

In use, it will be understood that bait is placed in the bait container 10 near the center thereof and the connector 21 is plugged in to a convenient power outlet so that both bus bars 16 will be energized. The cover 23 is closed to prevent access to the bait through the top of the trough-shaped container 10 and the platforms 26 rest upon the floor or surface upon which the device is supported. As a rat, for instance, is attracted to the bait contained within the bait container 10, it will endeavor to gain access thereto through the open end thereof, and standing on the platform 26, the animal will contact both electrodes 17 and will receive sufficient electrical energy through its body to become electrocuted. The device of this invention may be employed wherever a sufficient voltage can be impressed on the bus bars 16 and electrodes 17. Due to the fact that the end walls 12 and 13 project beyond the length of the bus bars 16, and the fact that the cover 23 is of such length as to overhang the ends of the bait container 10, it is obvious that accidental contact of humans with the electrodes 17 is inhibited, while at the same time the electrodes 17 are accessible to the vermin to be destroyed. It is obvious that the size of the device may be altered to enable it to be used for the destruction of mice as well as rats without in any way altering the functions of this invention.

While in the foregoing there has been shown and described the preferred embodiment of this invention, it is to be understood that minor changes in the details of construction and combination and arrangement of parts may be resorted to without departing from the spirit and scope of the invention as claimed.

Having thus described the invention, what I claim is:

In a vermin destroyer, a trough-shaped bait container open at opposite ends, a pair of spaced, parallel electrodes extending between the side walls of the bait container near but spaced inwardly from opposite ends thereof, said electrodes being so spaced from one another as to inhibit access of vermin to bait contained in the bait container, a conducting platform pivoted to the bait container at each end thereof, means establishing electrical connection between each platform and an electrode, a cover hinged to the upper edge of one of the side walls of the bait container and adapted to close the open, upper side thereof, said cover having its opposite end portions constituting guards overhanging the platforms when the cover is above the container, and means to establish electrical communication between the electrodes and a power source.

GEORGE A. WILSON.

REFERENCES CITED

The following references are of record in the file of this patent:

UNITED STATES PATENTS

| Number | Name | Date |
|---|---|---|
| 590,121 | Vaughn | Sept. 14, 1897 |
| 1,024,278 | Niederlitz | Apr. 23, 1912 |
| 1,305,672 | Ziavin | Aug. 13, 1912 |
| 1,307,678 | Kopel | June 24, 1919 |
| 2,302,787 | Meehan | Nov. 24, 1942 |